Figure 1:
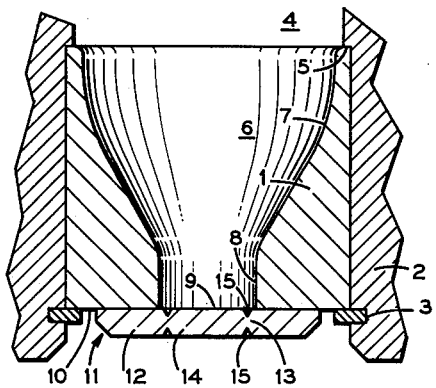

June 15, 1965  E. M. GALLE  3,189,107
FLUSHING PASSAGEWAY CLOSURES WITH REVERSE
PRESSURE RUPTURABLE PORTION
Filed Oct. 30, 1961  3 Sheets-Sheet 1

EDWARD M. GALLE  INVENTOR.

BY Roy H. Smith, Jr.
ATTORNEY

EDWARD M. GALLE  INVENTOR.

BY *Roy V. Smith, Jr.*
ATTORNEY

June 15, 1965 E. M. GALLE 3,189,107
FLUSHING PASSAGEWAY CLOSURES WITH REVERSE
PRESSURE RUPTURABLE PORTION
Filed Oct. 30, 1961 3 Sheets-Sheet 3

EDWARD M. GALLE INVENTOR.

BY

ATTORNEY

United States Patent Office 3,189,107
Patented June 15, 1965

3,189,107
FLUSHING PASSAGEWAY CLOSURES WITH REVERSE PRESSURE RUPTURABLE PORTION
Edward M. Galle, Houston, Tex., assignor to Hughes Tool Company, Houston, Tex., a corporation of Delaware
Filed Oct. 30, 1961, Ser. No. 148,559
21 Claims. (Cl. 175—393)

The present invention relates to temporary closures used in passageways through which a stream of fluid is delivered, and more particularly to temporary plugs used to prevent the backflow of fluids through a passageway during periods when it is not being utilized for normal, forward flow. Such plugs are of particular utility for the fluid flushing passageways of earth penetrating tools of the type wherein a tool used to cut formation is connected with surface equipment by a hollow drill string used to supply a flushing fluid to the tool and its flushing passageways.

In well drilling, it is a well known common practice, in removing cuttings formed by the rock bit, core bit or reamer, to circulate a liquid medium down the hollow drill string to the bottom of the hole and then up the annulus between the drill string and the borehole or casing. When the cutting tool has become dulled to the point of unprofitable drilling, it is necessary to raise the drill string, change over to a new cutting tool, and return the new tool and drill string to the point where cutting is to be resumed.

In making such a "round trip," it is common practice to stop the pumps used to circulate the drilling fluid. As the drill string is raised and uncoupled, the drilling fluid therein is permitted to drain from the discharge openings of the flushing passageways in the cutting tool, thus leaving the borehole virtually completely filled with drilling fluid when the raising phase of the round trip is completed. When the tool changeover has been made and the tool is to be lowered in the hole while assembling the drill stem section by section, the drilling fluid rises through the discharge openings of the cutting tool. Thus no advantage is taken of the buoyant effect of the drilling fluid on the drill string, and the full weight thereof must be supported by the above-ground system, resulting in accelerated wear on the wire line, brakes, etc.

Prior workers in the well drilling art have developed devices to utilize the buoyant force of the drilling fluid in a well bore while lowering a drill string, the most common of which is a float valve, i.e., a valve inserted in the lower part of the drill string which blocks the upward flow of drilling fluid but permits it to flow downwardly. While such float valves work well enough when new, they are relatively expensive and have the further disadvantage that the valve erodes fairly rapidly, requiring replacement after two or three drilling runs.

In addition, float valves do not prevent the undesired and inadvertent plugging of flushing passageways by detritus which sometimes occurs when a drill string is lowered into a borehole, particularly in the smaller orifice sizes. The sometimes used wire screens are helpful in preventing such plugging, but such screens are typically quite coarse and thus are less than completely effective in preventing plugging by collections of small particles of cuttings and other detritus.

It is the primary object of the present invention to provide an expendable flushing passageway closure effective to prevent the backflow of fluids through such a passageway and expellable forwardly therethrough under the force of a fluid directed therethrough.

Another object is to provide a relatively inexpensive flushing passageway closure expellable through the discharge opening thereof with a positive pressure gradient and sealably plugging the passageway against backflow when the pressure gradient is negative.

A subsidiary object is to provide nozzle plugs which will prevent the entry of cuttings and other detritus into the flushing passageway with which it is engaged, such plugs being used when a tool and drill string are being lowered into a hole and being expellable downwardly when the drill string is filled with drilling fluid.

Also to be considered in running an empty drill string into a hole are the extremely high hydrostatic pressures at and near the bottom of a deep hole filled with drilling fluid. Such high pressures tend to collapse the drill pipe inwardly, and will indeed do so unless some relief is afforded. While such relief can be obtained by flowing sufficient drilling fluid into the string to reduce the pressure gradient over the walls of the lowermost drill stem sections to a safe value, the preferred embodiment of the present invention accomplishes such relief by an altogether different technique. In general, this technique is to provide a flushing passageway closure which will withstand negative pressure gradients and seal against backflow up to a safe margin below the collapse pressure of the drill stem, and above such presure will rupture or fracture to permit upward flow of the drilling fluid through the nozzle.

Accordingly, it is another object of the present invention to provide an expendable flushing passageway closure which is expellable under modest positive pressure gradients and seals the passageway against backflow at negative pressure gradients up to a safe margin below the collapsing pressure of the lowermost drill stem sections, thereafter bursting or shearing to permit negative fluid flow, i.e., upwardly through the passageway.

A subsidiary object is to provide such plugs or closures which are breakable when expelled or forced downwardly from the flushing fluid passageway, the underlying purpose thereof being top prevent the substitution of a plug with a rupturable portion expellable upwardly only under negative pressure gradients in excess of the collapse pressure of the associated drill pipe.

Figure 4:
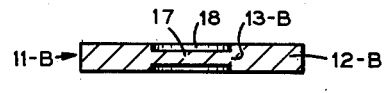
Figure 5:
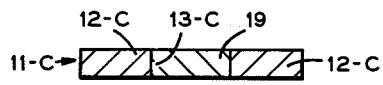
Figure 2:
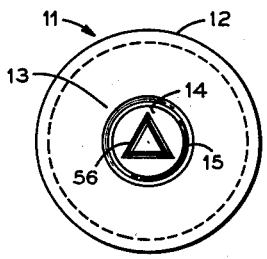
Figure 6:
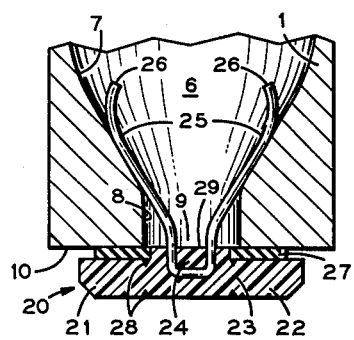
Figure 3:
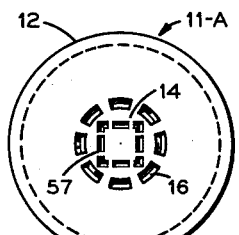
Figure 7:
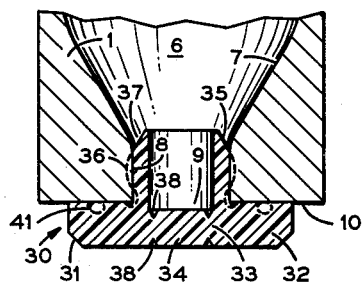
Figure 8:
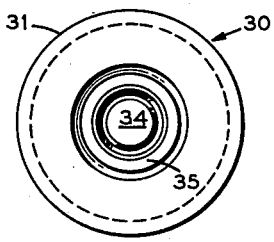
Figure 11:
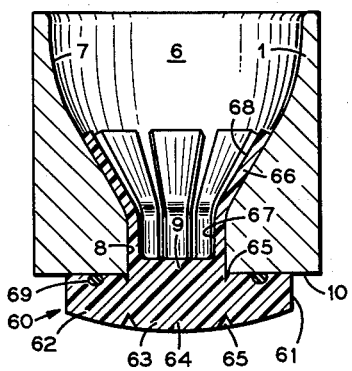
Figure 9:
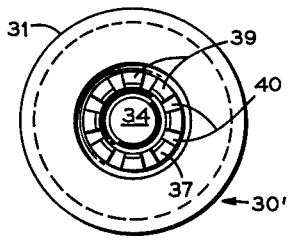
Figure 12:
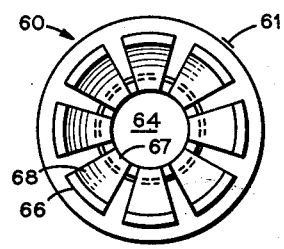
Figure 10:
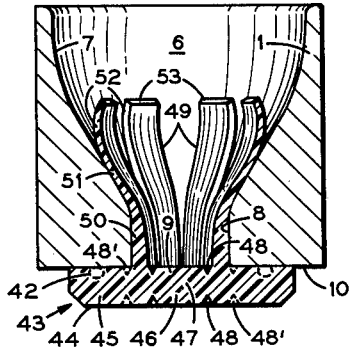
Figure 13:
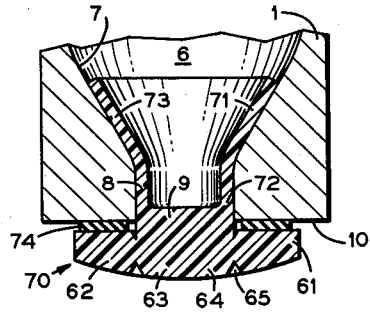
Figure 14:
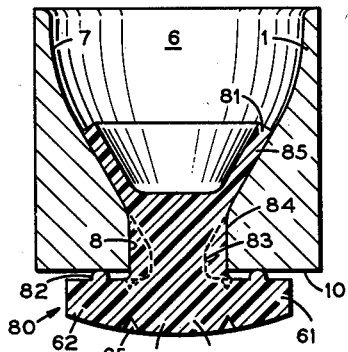

The present invention may be more readily comprehended by considering the accompanying drawing, hereby incorporated herein, in which drawing:

FIGURE 1 is a sectional view of a plate type closure of the present invention installed in operation position beneath the discharge opening of a flushing fluid passageway, FIGURE 2 is a top view of the plate type closure of FIGURE 1, FIGURE 3 is a top view of an embodiment similar to that of FIGURES 1 and 2 but having an alternate means for defining the rupturable portion of the closure, FIGURES 4 and 5 are sectional views of other plate type closures, similar to those of FIGURES 1-3 but differing therefrom in the means for defining the rupturable portion of the closures, FIGURE 6 is a cross section of a closure using spring fingers to retain the closure in the flushing passageway, FIGURE 7 is a cross section of a closure using as a means of retaining the closure in a cylindrical flushing passageway a member which may be annular or may be slotted to form spring fingers, the view being of the embodiment with an annular retaining member, FIGURE 8 is a top view of the FIGURE 7 embodiment in which the retaining member is annular, FIGURE 9 is a top view of the FIGURE 7 embodiment in which the retaining member is slotted to form spring fingers, FIGURE 10 is a section view of a modified type of closure using spring fingers to retain the closure in a flushing passageway, particularly the type passageway having a lower cylindrical portion above the discharge orifice and an upper portion converging downwardly into the cylindrical portion, FIGURE 11 is a sectional view of a closure used with a flushing passageway having an upper, downwardly converging surface and a lower, cylindrical surface in which the retaining part of the closure contacts the converging surface of the passageway and, analogously to the FIGURE 7 embodiment, may be annular or slotted to form spring fingers, the slotted embodiment being illustrated, FIGURE 12 is a top view of the closure of FIGURE 11, FIGURE 13 is a cross section view of a closure similar to that of FIGURE 11 but illustrating a closure with an annular retaining member, FIGURE 14 is a cross section view of a closure similar to those of FIGURES 11–13 and illustrating the annular type retaining member, and differing therefrom in having a relatively thicker center portion. The phantom outline of FIGURE 14 also illustrates the fact there is no necessity for the portion of the closure in the nozzle throat to hug the wall thereof. It should also be noted that FIGURES 13 and 14 show the use of flat and integral gaskets while FIGURE 11 shows the use of a resilient O-ring, although these are, of course, interchangeable.

Figure 16:
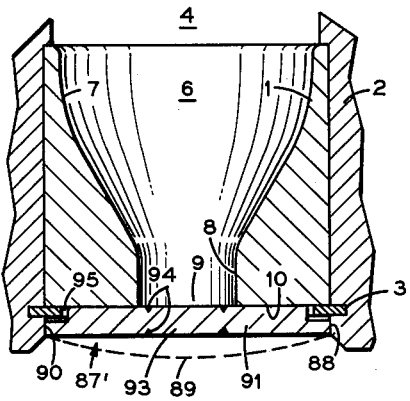
Figure 15:
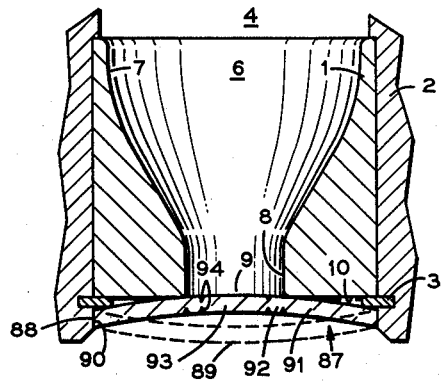
Figure 17:
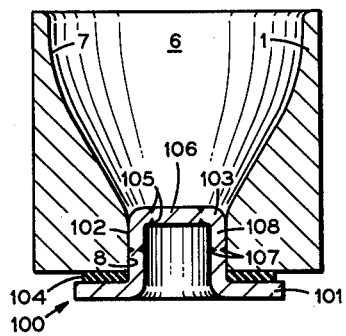

FIGURE 15 illustrates in cross section an embodiment in which an arcuate plate type closure is forced fitted into sealing attitude, FIGURE 16 is a refinement of the FIGURE 15 embodiment, and FIGURE 17 is a cross sectional view of a hat-like closure extending into a flushing passageway.

Before describing the illustrated embodiments in detail, it is here pointed out that the embodiments depicted in the drawing and described below may be used with various types of structures defining flushing fluid passageways. While the drawing depicts a replaceable nozzle of the type described in the patent to Payne, 2,855,182, and in some figures show the same means for disposing such a nozzle in a boss of a rock bit, it is apparent that the closures of the present invention are not limited thereto. The "shrouded" nozzle disposition shown in the co-pending application of W. A. Kistler, S.N. 702,060, filed December 11, 1957, now abandoned, and in Mandrell, U.S. Patent 3,115,200, may also utilize the closures of the present invention.

In addition to the shaped nozzles in the aforementioned patent and application, i.e., nozzles in which the flushing passageways are defined by an upper wall converging downwardly into a throat or lower cylindrical wall just above the discharge orifice, certain embodiments of the present invention as described below may be used with the older but still popular straight through passageways. Such passageways, for instance, are described in the integral jet bit patent of Reifschneider, 2,807,444, and, in the form of passageways down through the center of the bit (commonly called "drilled water courses"), in the U.S. Patents to Medlock et al., 3,125,174 and 3,125,175.

Since the closures of the present invention do not depend on replaceability vel non of any structural member used to define a fluid flushing passageway, all such members are treated as integral parts of the earth penetrating tool with which they are to be used. Thus in the description below and the appended claims all surfaces engaged by the closures are treated as parts of the tool whether such surfaces are on the main body of the tool or on a replaceable part thereof. This is not to imply that the closures can not be placed in and removed from a replaceable nozzle when the latter is removed from the tool, as is indeed the fact for all embodiments except that shown in FIGURES 15 and 16.

FIGURE 1 shows a cross section of a nozzle 1 retained in a bit boss 2 by a split snap ring 3. As indicated, the nozzle is retained in the passageway 4 of the bit against upward movement by a shoulder 5, and has a central flushing passageway 6 therethrough. Flushing passageway 6 consists of an upper portion defined by the downwardly converging wall 7 and a lower portion or throat region defined by the short cylindrical wall 8, the two walls merging smoothly as shown and the entire passageway terminating in a discharge opening 9. Surrounding discharge opening 9 and generally transverse passageway 6 is surface 10 of the bit or other earth penetrating tool.

The closure of the present invention indicated generally at 11 consists of a plate having peripheral portion 12 and center portion 13. While these portions are actually continuous parts of a single member in the FIGURE 1 embodiment, peripheral portion 12 may be thought of as having an inner terminus at the intersection of discharge opening 9 and surface 10 of the bit, and center portion 13 may be thought of as connected to such inner terminus and completely bridging and filling the gap defined thereby.

Center portion 13 includes the rupturable portion 14 underlying discharge opening 9. This rupturable portion 14 is defined in a number of ways, in FIGURES 1 and 2 (FIG. 2 being a top view of closure 11 removed from the tool) by a closed groove 15 in one or both the bottom and top surfaces of the plate or, as indicated in FIGURE 3, by intermittent grooving 16. The important point is that there be a zone or juncture defining the rupturable portion of reduced average thickness with respect to the part of the plate radially outside of the reduced thickness zone. The thickness of the peripheral portion 12 is such that it will withstand all normally expected pressure gradients in even the deepest drilling, but the thickness of that zone of the plate underlying groove 15 or 16 is such that it will shear at a predetermined axial pressure gradient. The intermittent grooving of FIGURE 3 may be used in place of the full grooving of FIGURES 1 and 2 because the quantity determinative of shear yielding, other conditions being the same, is the shear area of the section involved. Obviously the intermittent grooving 16 of FIGURE 3 must be deeper than that of FIGURES 1 and 2 if both are cut on the same radius in plates of the same material and thickness, and both are to shear at the same pressure gradient. Similarly, a groove in only one surface must be deeper than aligned grooves in both surfaces. These considerations also apply to junctures of other shapes, e.g., triangular, square, etc. Only annular or intermittent-annular grooves are shown, but other types are feasible, particularly when such grooves are formed by a punching operation. Such grooves are indicated in the phantom outlines 56 and 57 of FIGURES 2 and 3.

The closure 11 is bonded to the annular surface 10 of the tool with a comparatively weak adhesive, weak enough to allow of downward rupture and consequent explusion of closure 11 under downward pressure gradients exceeding a modest value, e.g., 200–300 p.s.i. This criterion for separation permits the bond to be retained during ordinary handling of the assembly, including accidental dropping or jarring when lowering the tool in a borehole. Such pressures are quite modest for the typical mud pumps used in oil well drilling and the like. The adhesive used, will, of course, vary with the materials to be bonded, an example for a closure 11 of aluminum and a nozzle 1 of tungsten carbide being one of the epoxy resins.

FIGURE 4 illustrates a modification wherein a plate type closure 11B has its entire rupturable portion 17 of a reduced thickness. In this embodiment the groove 15 or 16 of FIGURES 1–3 is replaced by a hole or well 18 on either or both surfaces of the closure.

FIGURE 5 illustrates another modification of a plate type closure which includes a rupturable member 19 which may be as thick as or thicker than peripheral portion 12-C. No grooves are provided, and rupturable portion 19 of the closure is an insert bonded to peripheral portion 12-C in sealing relationship. Portion 19 is expelled upwardly either by failure of the bond or by fragmentation of the entire disc.

It should be noted that in FIGURE 5 the outer peripheries of center portion 13-C and rupturable portion 19 are coterminous, whereas in FIGURES 1-4 the rupturable portions lie inside the center portion. This has been done to illustrate that the outer periphery of the rupturable portion may be fixed at any radius up to that of the discharge orifice 9 (or of the throat, if the nozzle includes a divergent section). The rupturable portions of the FIGURES 1-4 embodiments may be as large in radius as that of the FIGURE 5 embodiment, or vice versa. A radius somewhat smaller than that of the discharge opening 9 (or throat) is preferable, as an actual separation in service does not entail the risk of a sticking of the ruptured portion in the flushing passageway, either in the upward rupture or a subsequent downward movement, as might be the case with a ruptured portion of the same radius as the discharge opening.

In practice, the dimensions of the closures of FIGURES 1-5 are determined by the materials selected, the size of the discharge orifice, and the characteristics of the lowermost drill stem sections. Suitable materials are metals and the relatively rigid or semi-rigid plastics such as "Bakelite," epoxies, etc., overly resilient materials such as soft rubber and cork being avoided. While the hard palstics are somewhat preferable to the metals because they are more easily comminuted and carried away with the formation cuttings, relatively soft metals such as aluminum and soft steel may be used without particular damage to the cutting tool.

As an example of the grooving 15 in the embodiment of FIGURES 1 and 2, assume that the pressure $p$ at which rupturable portion 14 is to be sheared from the balance of closure 11 is 6760 pounds per square inch (p.s.i.), this being a safe margin below the collapse pressure of the lowermost drill stem sections. The material selected for the closure is an aluminum alloy having a shear strength $S$ of 11,000 p.s.i. Assuming a nozzle with a discharge opening 9 with radius of $\frac{3}{16}$ inch, a radius $r$ of $\frac{1}{8}$ inch is selected for groove(s) 15. The thickness of the closure plate 11 is $\frac{1}{8}$ inch.

The hydrostatic forces $F_H$ tending to force rupturable portion 14 upwardly is $$F_H = \pi r^2 p$$

This force must be equal to the shearing force $F_s$ acting on the vertical surface underlying groove(s) 15, the area $A$ of which is $2\pi rt$, where $t$ is the thickness of the shear section underlying groove(s) 15. Thus $F_H = F_s = AS = 2\pi rtS$, or $\pi r^2 p = 2\pi rtS$ or $$t = \frac{r}{2}\frac{p}{S} = \frac{.125''}{2} \times \frac{6760 \text{ p.s.i.}}{11,000 \text{ p.s.i.}}$$

$$t = 0.038 \text{ inch.}$$

The thickness of the plate must be reduced by 0.125-0.038 or 0.087 inch at radius $r$, either by a single groove 15 of 0.087 inch depth or by a pair of registering grooves 15 of half this depth.

It is apparent from the above computation that the thickness of the plate underlying the grooving is directly proportional to the radius of the groove. For any smaller radius than that in the example such thickness will be smaller, i.e., the groove depth must be increased. For any larger radius, the thickness remaining after grooving the plate must be increased, i.e., the grooving must be shallower. For instance, if the grooving is to be made at the full $\frac{3}{16}$ inch radius of the discharge opening 9, the thickness $t$ of the shear section must be 0.0576 inch, or each of a pair of registering grooves 15 must have a depth of 0.034 inch.

It should be noted that FIGURES 1-5 do not include an embodiment including an unaltered plate of constant thickness, where reliance might be placed on making the entire plate thin enough to shear at a safe margin below the collapse pressure of the drill string. Such an embodiment is not feasible because it would necessarily be so thin as to introduce bending. It would not be possible to predict the pressure under which the closure would fail, as failure could be in shear, bending, or a combination of shear and bending. There is a good possibility of partial failure in which the closure would be bent and forced into the passageway in blocking relationship therewith.

In FIGURE 6, a disc or plate 21 has secured to its rupturable portion 24 two or more radially flexible, upwardly extending spring fingers 25 engaging the downwardly converging nozzle wall 7 defining passageway 6. Spring fingers 25 have relaxed positions in which the tips 26 have a greater radius than in the compressed position shown, and are radially flexible under the influence of a modest downward pressure gradient to a small enough radius to pass through discharge opening 9 during expulsion. Note that tips 26 are curved inward slightly to facilitate insertion into the passageway 6.

As in the previously described embodiments, that of FIGURE 6 has a flange or peripheral portion 22, a center portion 23 underlying the discharge opening 9, and the rupturable portion 24. Since it is not necessary to hold the plate 21 to surface 10 with adhesives, a conventional gasket 27 of rubber or other resilient material may be used to provide an improved seal between flange 22 and surface 10. While such gaskets are not entirely essential, particularly with the semi-rigid plastics suitable for plate 21, they do decrease the possibility of leakage upwardly.

Also as in the other embodiments, the rupturable portion 24 of the FIG. 6 closure may be defined in various ways, including the pair of matching grooves 28 shown in the drawing and the other means described above in connection with FIGURES 1-5. The raised boss 29 of rupturable portion 24 is not essential, but it does serve as a means for securing gasket 27 and, in addition, illustrates that the thickness of the rupturable portion of a plate is not important when such rupturable portion is defined by a closed band of reduced thickness. The band referred to must be reduced in thickness with respect to the thickness of the plate proceeding radially outwardly.

It should be noted that the FIGURE 6 embodiment may also be used with untapered, straight-through flushing passageways.

FIGURES 7-9 illustrate a closure 30 which includes the plate 31 and its peripheral portion 32, center portion 33 and rupturable portion 34, similar to the earlier described embodiments. Extending up integrally with and normally from plate 31 at the juncture of the peripheral and center portions is a holding or retaining member 35 peculiarly shaped and adapted to exert a radially outward force on a cylindrical wall of the passageway 6 or a straight-through passageway of cylindrical or other axially parallel sidewall shape (e.g., drilled water course). The wall of retaining member 35 is sufficiently thin so that it may be a complete annulus of sufficient resilience so that a portion thereof has the relaxed contour indicated at 36, wherein a portion has a slightly greater radius than that of cylindrical wall 8. The upper end of retaining member 35 is slightly beveled at 37 to facilitate insertion in the passageway. Of course, the force exerted by 35 on the wall 8 is just enough to retain the closure in position until a modest downward pressure gradient is exceeded. The rupturable portion 34 is defined by the grooves 38 or by any of the means shown and described in connection with FIGURES 1-5.

The FIGURE 7 embodiment may also be modified by providing one or more axial slots 40, which if numerous enough convert member 35 into a multiplicity of spring fingers 39, as indicated in the top view of such a modification in FIGURE 9. Such fingers may be radially thicker than member 35 and preferably have relaxed positions in which their upper ends have a greater radius than the radius of wall 8.

Both the FIGURE 7 and the FIGURE 10 embodiments indicate in phantom an O-ring 41 (42 in FIG. 10) which may be used to guarantee a good seal under negative pressure gradients.

The FIGURE 10 embodiment 43 is similar to the embodiments of FIGURES 6–9, having a plate 44 consisting of peripheral portion or flange 45 sealingly engaging surface 10 of the tool under upward pressure gradients, center portion 46 underlying discharge opening 9 and rupturable portion 47 defined by grooves 48 in either the upper or lower surface of plate, or preferably both surfaces. The earlier described alternate means for defining rupturable portion 46 of plate 44 may be used, and it should also be observed that the grooves 48 may be positioned radially outwardly, as indicated by the phantom grooves 48'; to make center portion 46 of the plate 44 consist entirely of rupturable portion 47.

Closure 43 of FIGURE 10 differs from closure 30 of FIGURE 7 in that the former has a multiplicity of upstanding spring fingers 49 integral with plate 44 and normal thereto, such spring fingers being adapted to engage and exert a holding force on both the cylindrical surface 8 and the downwardly converging surface 7 of passageway 6. Each finger 49 has a bottom or lower portion 50 adapted to engage the straight-through wall 8 just above discharge opening 9, a middle portion 51 integral with bottom portion 50 and extending therefrom upward and radially outwardly in contact with the downwardly converging wall 7 defining part of passageway 6, and an upper or top portion 52 integral with middle portion 51 and extending upwardly and radially inwardly therefrom.

Upper or top portions 52 of spring fingers 49 are not indispensable, but they do assist a ready insertion of the closure 43 in passageway 6. When used, the upper tips or free ends 53 should have radii such that they will not jam together under the maximum inward flexing which take place during insertion or expulsion when the middle portions 51 of fingers 49 contact the straight-through wall 8. From this consideration, it is apparent that closure 43 is also adaptable for use with the drilled water course type of passageway. In either such position or that shown the closure is expellable under modest downward pressure gradients, as the relaxed position of spring fingers 49 is such that they have been only slightly greater radii than in the radially inwardly flexed position shown.

FIGURES 11–14 illustrate closure embodiments of the present invention designed primarily as non-reuseable plugs, the term "non-reuseable" being used to connote a closure which will be so broken upon downward expulsion under modest pressure gradients or when pulled out by hand as not to be re-insertable for further use. Such closures have the inherent advantage that those forewarned are not likely to remove them and thus let the tool go into a hole unprotected, or to attempt removal and replacement with a closure rated for drill stem sections having a higher collapse pressure than those to be employed. With this type closure, nozzle and closure are handled as a unit, and the unit to be used must be selected for both the desired discharge orifice and proper rating of closure for the drill stem to be used.

FIGURE 11 shows a closure 60 having a plate 61 with the same peripheral portion 62, center portion 63 and rupturable portion 64 as in earlier described embodiments, the rupturable portion being defined by grooves 65 located at the outer periphery of center portion 63 (edge of discharge opening 9), as shown, or inwardly between the inner radii of fingers 66. A gasket in the form of an O-ring 69 may be included to insure a tight seal. Fingers 66 have bottom or lower portions 67 engaging cylindrical wall 8 and upper portions 68 engaging a part of downwardly converging wall 7 defining passageway 6.

The FIGURE 13 embodiment 70 is identical with the closure 60 of FIGURES 11–12, and has identical reference numerals, except in that closure 70 has a retaining member 71 in the shape of an annular wall rather than a multiplicity of fingers. FIGURE 13 also illustrates that only a single groove 65 suffices to define rupturable portion 64 of plate 61, and that a flat gasket or washer 72 of resilient material such as rubber may be used in place of an O-ring to insure a complete seal. The annular retaining member 71 has a lower or bottom portion 72 engaging straight-through wall 8 and an upper, upwardly diverging portion 73 engaging a part of the downwardly converging wall 7 defining passageway 6.

The embodiments of FIGURES 11–14 are conformed in place to the downwardly converging wall defining passageway 6. The material used is preferably a plastic such as a polymerizable, thermosetting resin, although the thermoplastic materials may also be used. The thermosetting resin is preferably one that hardens or polymerizes sufficiently slowly under the influence of heat or an admixed catalyst, or both, as to go through a plastic stage, one in which it retains its original shape until force is exerted to give it a new shape, the closure retaining such new shape when the deforming force is withdrawn. The closure is inserted in the passageway with the shape shown except that fingers 66 (retaining member 71 of FIG. 13 or 81 of FIG. 14) are completely cylindrical, i.e., upper portions 68, 73, or 85 are upward extensions of lower portions 67, 72, or 84 without change in direction. The material of the closure being already in the plastic state, or a plastic state being then obtained with the application of heat, the upper portions of the fingers are bent into the configuration shown by a forming tool (not shown) lowered through the upper end of passageway 6. The curing and/or cooling of the plastic closure to a hard brittle state is completed, and the non-reuseable closure is complete.

When a modest downward pressure gradient is exerted on this type closure, the retaining member or fingers are flexed radially inwardly, and such member of fingers are quickly broken and expelled together with the lower part of the closure.

FIGURE 14 depicts an embodiment 80 of non-reuseable closure differing from that of FIGURES 11–13 in only minor respects. The center and rupturable portions 63' and 64' are of greater depth in closure 80, extending above the straight-through wall 8 of passageway 6, in which case retaining member 81 (which may be slotted to define fingers), having lower, cylindrical part 84, and upper, outwardly tapering part 85, will break under modest pressure gradients at its point of greatest flexure, its joint with center portion 63'.

No gasket or face-to-face seal is used with the closure 80 of FIGURE 14, reliance rather being placed on an annular bead 82 integral with plate 61. This sealing bead provides the advantage of concentrating the hydrostatic force on a relatively small area to effect a superior seal.

In the closures embodiments thus far described in connection with FIGURES 11–14 the illustrated contact between the straight-through wall 8 defining the lower part of passageway 6 and the lower, cylindrical portion of the various retaining members serves as little more than a non-essential centering means, as little or no reliance is placed therein for retention or extra sealing. Since such contact is actually unnecessary, it is apparent that any of the closures of FIGURES 11–14 could be modified as indicated by the phantom outline of FIGURE 14, wherein retaining member 81 is connected with the center portion 63' or rupturable portion 64' of plate 61 by a member 83 of cross section less than that of wall 8 and not in contact therewith.

FIGURES 15 and 16 illustrate closures of the type consisting of a plate in the form of an arcuate cap, usually spherical, prior to installation. Such a closure 87 has a periphery 88 which in the relaxed position 89 of the closure matches that of a surface 90 of an earth penetrating tool, such surface 90 being below, adjacent and generally normal to the surface 10 transverse and surrounding discharge opening 9. In the typical cylindrical structure generally used, surface 90 is co-axial with the flushing passageway 6 and intersects surface 10 at the outer periphery of 10, but for the snap ring 3 and its accommodating groove in surface 90. Thus both the surface 90 and the periphery 88 of closure plate 87 are cylindrical.

The closure 87 of FIGURE 15 is inserted in contact with surface 90 in the relaxed position 89 shown, and is forced into the sealing position shown by a blow from an appropriate instrument. The material of the closure, e.g., aluminum, flows and the closure is actually permanently set in such position, one in which it sealingly engages a part of the surface 10 surrounding the discharge opening 9. Additional sealing is provided by the tight fit between the periphery 88 of the closure and cylindrical surface 90 of bit boss 2. In other respects, closure 87 is like earlier described embodiments in that it has a peripheral or flange portion 91, center portion 92 and rupturable portion 93 defined by grooves 94 in one or both surfaces of the plate. Its mode of operation as to both downward expulsion under modest pressure gradients and upward rupture of portion 93 are also like those in embodiments already described.

The closure 87' of FIGURE 16 is identical with closure 87 of FIGURE 15 except that a groove 95 has been cut in its periphery 88 at the top thereof to accommodate snap ring 3. This permits forcing the closure into the sealing position shown, wherein it sealingly engages substantially the full area of surface 10. The flat engaged shape of closure 87' affords a somewhat better seal than that of closure 87 of FIGURE 15, which is slightly convex upward in final position. It is believed to be apparent, however, that the closure member 87 of FIGURE 15 will have a flat final shape as in FIGURE 16 when used in conjunction with a tool and flushing passageway like those of these figures but for the omission of snap ring 3. Such a fit is obtainable, for example, with a drilled water course having a surrounding countersunk hole at the discharge orifice.

FIGURE 17 illustrates a closure 100 departing from those previously described in that it has the shape of a hat, or an inverted cup or tumbler with a flange 101 integrally attached to the open end of the vertical annular wall 102 thereof. The base 103 of the inverted installed closure 100 is integral with annular wall 102, and the two parts are together analogous to the center portion of the above described plate type embodiments. The cross-sectional dimension (outside diameter) of wall 102 near base 103 must, of course, not exceed that of discharge opening 9 in the installed position, or any smaller throat area above the discharge opening if the passageway has a downwardly diverging orifice. In the relaxed (uninstalled) position, the wall 102 of closure 100 has a somewhat larger diameter, and the whole closure is radially flexible for insertion and retention until a modest downward pressure gradient obtains. A gasket 104 insures a superior seal.

Closure 100 of FIGURE 17 also differs from prior described embodiments in that the rupturable portion which insures against drill stem collapse at dangerously high pressures can be defined in two different ways. The conventional grooves 105 for shear failure are provided in base 103 to define a rupturable portion 106. Alternatively, grooves 107 may be provided in vertical wall 102 to define a rupturable portion 108 consisting of base 103 and the upper part of the annular vertical leg 102. This rupturable portion 108 fails in tension as distinguished from shear, and the depth of groove required for such failure is readily calculable from information readily available. It should be noted that either grooves 105 or 107, or both, may be provided to obtain the desired result.

From the above detailed description, it can be concluded that the present invention comprises closures means for a drilling tool flushing passageway adapted to block such passageway against backward flow of fluids under negative (upward or backward) pressure gradients about as high as a value within a safe margin of the collapse pressure of the drill stem sections just above the drilling tool, and to permit such backward flow when such safe margin is exceeded. Absent the need for such backflow, the closure is also adapted to be expelled downwardly to unblock the pasageway when drilling fluid is forced or allowed to flow downwardly through the flushing passageway until a modest downward pressure gradient prevails, e.g., 200–300 p.s.i. Such closures are quite cheaply fabricated and are regarded as useable in a well hole only once, but nevertheless effect a large saving over the alternate float valve, with its comparatively large capital cost and expensive repetitive repair.

Broadly, these closures of the present invention are useable in conjunction with any tool having a surface surrounding and generally transverse the discharge opening of its flushing passageway, and consist broadly of a peripheral or flange portion adapted to sealingly engage such surface under negative pressure gradients without internal failure at all predictable values of all such gradients, the inner periphery of such flange being at the edge of the discharge opening, and a center portion integrally joined to the flange at its inner periphery and completely bridging the gap defined thereby, such center portion including a rupturable portion, which may be coextensive therewith, separable from the balance of the closure under axial pressure gradients within a safe margin of the collapse pressure of the lowermost drill stem sections, the closure as a whole being securable to the passageway and/or adjacent surfaces below its discharge opening to be expelled downwardly therefrom at modest downward pressure gradients.

It has been pointed out that the size of the rupturable portion of these closures relative to the size of the discharge opening may be varied. Of course, the rupturable portion should not exceed the discharge opening in size, and preferably does not exceed the diameter of any restricted throat above the discharge opening. The most naturally shearable size is one equal to the discharge opening in size, as the greatest resisting force exerted by the tool is at the edge of the discharge opening. Rupturable portions smaller than the discharge opening, however, offer the advantage of less likelihood of passageway blocking when the ruptured member is later flushed down. The balance of the closure will quickly be expelled when the flushing fluid is initially pumped downwardly, thus leaving a gap between the O.D. of the ruptured portion and the inside diameter of the discharge opening, a gap not present is the case when the diameters of the discharge opening and ruptured portion are the same. However, it should be pointed out that when a bit with multiple flushing fluid passageways has all passageways protected with closures, the likelihood of more than one closure rupture is extremely unlikely. In the typical three cone rock bit, for instance, should the pressure encountered require relief of the drill stem against danger of collapse, the first of the three closures to rupture will quickly eliminate the pressure gradient over the other two.

It has also been pointed out that the rupturable portion of certain closures of the present invention is defined from the balance of the closure by a juncture or zone of reduced thickness, i.e., the thickness remaining under a groove, pair of registering grooves, or the like. Such remaining thickness has a surface area through which shearing takes place at a predetermined pressure. Such surface may have a wide variety of geometries such as circular, polygonal, etc., may be made by full grooving or intermittent grooving, etc., the essential requirement being a juncture of reduced average thickness (or reduced shear strength). The surface is preferably, but not necessarily completely closed.

As used in the appended claims, the terms "forward pressure gradient" and "positive pressure gradient" both refer to a normal flow of fluid through a passageway having a discharge end through which the fluid leaves the passageway and the tool containing such passageway, and connote a condition in which the fluid pressure inside the passageway is greater than the outside the passageway and adjacent its discharge end. Similarly, "reverse pressure gradient" and "negative pressure gradient" are used in the same frame of reference and connote a higher fluid pressure adjacent and outside the passageway than therewithin.

1. A closure for a generally downwardly extending flushing fluid passageway in an earth penetrating tool connected to equipment at the surface of the earth by a hollow drill stem through which flushing fluid is supplied to said tool and passageway, such tool also having a surface surrounding and generally transverse the discharge end of said passageway, said closure comprising a member having means for securing it to said tool at said discharge end of the passageway so that it is expellable downwardly therefrom at predetermined downward pressure gradients, said member having a peripheral flange portion adapted to sealingly engage said traverse surface of the tool under the influence of all predictable upward pressure gradients, said peripheral portion having an inner terminus at the intersection of said discharge end of the passageway and the adjacent transverse surface of said tool, and a center portion connected to said inner terminus of said peripheral portion to completely bridge and fill the gap defined thereby, at least a part of said center portion consisting of a rupturable portion secured to the balance of the member by a juncture of such reduced strength that the upturable portion is predictably separable from the closure at such juncture and is expellable upwardly under the influence of upward pressure gradients in excess of a safe margin below the collapse pressure of the lowermost sections of said drill stem, said upward pressure gradients at which the rupturable portion is separable being greater than said predetermined downward pressure gradients.

2. The closure of claim 1 in which the peripheral and center portions of said members are continuous parts of a plate underlying said discharge end of the passageway and adjacent transverse surface of said tool, said securing means comprising a low strength adhesive between said peripheral portion of the plate and said transverse surface, said rupturable portion being defined by a central part of said plate of reduced thickness.

3. The closure of claim 1 in which the peripheral and center portions of said member are continuous parts of a plate underlying said discharge end of the passageway and adjacent transverse surface of said tool, said securing means is a low strength adhesive between said peripheral portion of the plate and said transverse surface, and said plate defined from the balance thereof by a juncture comprises a section of said plate which is of reduced average thickness.

4. The closure of claim 3 in which said juncture in said section of the plate is defined by annular grooving in at least one of the surfaces of said plate transverse to said passageway.

5. The closure of claim 1 in which said peripheral and center portions of said member consist essentially of a continuous plate, said securing means comprises a low strength adhesive between said peripheral portion of the plate and said transverse surface of the tool, and said juncture comprises a low strength adhesive bonding said rupturable portion to the balance of said plate, said juncture adhesive being of such low strength as to be destroyed under the influence of said upward pressure gradients.

6. The closure of claim 1 in which said peripheral and central portions of said member are continuous parts of a plate underlying said discharge end of the passageway and said surrounding transverse surface of said tool, and in which said securing means is a multiplicity of radially resilient spring fingers attached to said center portion and extending upwardly therefrom, said spring fingers being adapted to extend into said flushing passageway and exert an outward radial force on the walls thereof to retain said closure in position with said peripheral portion of said plate in sealing engagement with said surrounding transverse surface of said tool and also adapted to be flexed inwardly under the influence of said predetermined downward pressure gradients, said juncture comprising a section of said plate which is of reduced average thickness.

7. The closure of claim 6 in which said spring fingers extend upwardly from the rupturable central portion of said plate and are curved outwardly and upwardly to be adaptable for contacting the walls of said passageway above its discharge end.

8. The closure of claim 6 in which the wall of said tool passageway is cylindrical and said spring fingers are adapted to be flexed radially inwardly by said cylindrical wall to provide a means for holding said closure in sealing position and expellable downwardly at said predetermined downward pressure gradients, said rupturable central portion lying within the part of said plate at its juncture with said spring fingers, said fingers in the relaxed position having a slight outward taper from their junction with said plate to their free ends.

9. The closure of claim 6 in which the wall of said tool passageway has a cylindrical portion adjacent its discharge end and a downwardly converging portion above and joined to said cylindrical portion, and in which said spring fingers in the relaxed position have lower portions adjacent said plate of substantially cylindrical shape but tapering slightly outwardly upwardly, middle portions integral with said lower portions adapted to conform to a fraction of said downwardly converging portion of said passageway, and upper portions integral with said middle portions converging radially inwardly, said fingers being radially flexible for insertion in and removal from said passageway and for securing said closure in said nozzle against said predetermined downward pressure gradients and expulsion at higher downward pressure gradients and in which said rupturable portion lies within the juncture of said plate and said spring fingers.

10. The closure of claim 6 in which the wall of said tool passageway has a cylindrical portion adjacent its discharge end and a downwardly converging portion above and joined to said cylindrical portion, and in which said spring fingers in the relaxed position have lower portions adjacent said plate of substantially cylindrical shape but tapering slightly outwardly upwardly, and upper portions integral with said lower portions and tapering upwardly outwardly therefrom to conform to a fraction of said downwardly converging surface of said passageway, said fingers being relatively brittle and breakable when flexed under downward pressure gradients exceeding said predetermined value to permit expulsion of said closure downwardly.

11. The closure of claim 1 in which said member is adapted to be assembled to said tool with a ring gasket interposed between the upper surface of its peripheral portion and said transverse surface of the tool, and said member consists essentially of a rigid plate having said peripheral and central portions, said central portion having an inner boss projecting above said upper surface of the peripheral portion and adapted to face said discharge end of the passageway, said boss serving as a means for centering said ring gasket, said securing means comprises a multiplicity of spring fingers extending from said boss adapted to fit into said flushing passageway and exert an outward radial force on the walls thereof thereon to secure said plate in position and also adapted to be compressed inwardly under said predetermined downward pressure gradients, and said juncture comprises a section of said plate which is of reduced average thickness, said juncture being disposed approximately at said inner terminus of said peripheral portion of the plate so that said rupturable portion is essentially coterminous with said center portion.

12. The closure of claim 1 in which the wall of said tool passageway has a lower, cylindrical portion adjacent it discharge end and an upper, downwardly converging portion above and joining said lower portion, and in which the center portion of said member is of greater thickness than its peripheral portion, said center portion being adapted to extend upwardly into said lower, cylindrical wall when said peripheral portion contacts said tool surface surrounding and transverse said discharge end of the passageway, and in which said securing means is an upwardly outwardly flared holding member integral with the top of said center portion, said holding member being adapted to contact said converging surface of the passageway to retain said closure in flow blocking position in said passageway, said holding member being relatively brittle and separable by breaking from said center portion under said predetermined downward pressure gradients, said juncture comprising a section of said plate which is being of reduced average thickness and is disposed approximately at said inner terminus of the peripheral portion of the plate.

13. The closure of claim 12 in which said holding member is substantially completely annular and contacts portions of both the cylindrical wall and the downwardly converging wall of said passageway.

14. The closure of claim 12 in which said holding member comprises a multiplicity of fingers separated by slots.

15. The closure of claim 1 peculiarly adapted for an earth penetrating tool in which said tool has a surface generally vertical and parallel to the axis of said passageway below and adjacent its surface surrounding and generally transverse the passageway, said vertical surface being of larger diameter than at least the discharge end of said passageway, said member of the closure comprising an arcuate plate having a periphery matching that of said vertical surface of said tool in its relaxed position, said securing means comprising the interfit of the arcuate plate to the tool with the periphery of the plate matching that of said vertical surface of said tool and with the plate forcibly flattened so that it is permanently altered to an approximately flat shape, at least a part of the plate surface sealingly engages the transverse surface of the tool surrounding said discharge opening, and said plate is thus secured in position but is nevertheless downwardly expellable under predetermined downward pressure gradients, said rupturable central portion of said member consisting of a central part of said plate underlying said discharge end of the passageway and said juncture comprising a section of said plate which is of smaller average thickness than that of the balance of the plate radially outward from said juncture.

16. The closure of claim 15 in which said transverse and vertical surfaces of the tool intersect in an annular corner and said tool includes an annular ring member extending into said corner, said ring member underlying said transverse surface and having an inner periphery of smaller diameter than said vertical surface, said plate having its upper outer edge recessed to provide an annular recess in which said ring is received, said plate being flattened for substantially complete sealing engagement with said transverse surface.

17. The closure of claim 1 in which said member has the shape of a top hat having a brim corresponding to said flange portion and said center portion consists of a generally vertical wall joining said inner terminus of the flange and extending upward therefrom and a horizontal base spaced from said flange and extending across and joined to said vertical wall in flow blocking relation therewith, in which said securing means comprises said vertical wall having an outward flare from said base to said flange in the relaxed position and said member being adapted for press fitting the closed base end into a flushing passageway of smaller throat diameter than the average diameter of said generally vertical wall so that the latter exerts a radially outward force on the wall of said passageway to secure said closure in position and also adapted for expulsion downwardly under the influence of said predetermined downward pressure gradients, said flange being adapted to sealingly engage the transverse surface of said tool surrounding said discharge end, and in which said juncture comprises a section of said member which is of reduced average thickness.

18. The closure of claim 17 in which said rupturable portion is a part of said base and is defined from the balance thereof by said juncture, whereby failure will occur by shear in said juncture.

19. The closure of claim 17 in which said rupturable portion consists of said base and an upper part of said vertical wall, said juncture lies in said vertical wall and is sufficiently thinner than the balance of said wall so that failure occurs in said juncture by tension.

20. A closure for a tool having a fluid passageway therethrough and a surface surrounding and generally transverse the discharge end of such passageway, fluid normally flowing through such passageway and out of the discharge end thereof under the influence of a forward pressure gradient, said closure comprising a member having a flange portion adapted to sealingly engage said transverse surface under all predictable reverse pressure gradients and a center portion joined to said flange portion and extending across said passageway, and means for securing said member to said tool to prevent the expulsion thereof at all forward pressure gradients below a predetermined low value and permit expulsion thereof at all higher forward pressure gradients, at least a portion of the center portion of said member comprising a rupturable portion secured to the balance of said member at a joint of such reduced strength that the rupturable portion is separable from the closure at the joint and is expellable in the direction opposed to normal flow at all reverse pressure gradients in excess of a predetermined high value, said predetermined high value of reverse pressure gradient being greater than said predetermined low value of forward pressure gradient.

21. In a closure member of the type having a peripheral flange portion and a center portion lying within the flange portion, such closure member having means whereby it is securable to a tool having a fluid passageway therethrough terminating in a discharge opening through which fluid normally flows from such passageway under a positive pressure gradient, the tool also having a surface surrounding and generally transverse such discharge opening, such closure member being securable to the tool so that its flange portion sealingly engages the transverse surface and its center portion registers with the discharge opening of the passageway, the means whereby the closure member is securable to the tool permitting its separation from the tool at positive fluid pressure gradients in excess of a predetermined low value while the engagement of the flange portion prevents movement of the member into the passageway under the influence of even very high negative pressure gradients, *the improvement consisting of* providing a rupturable portion constituting at least a part of the center portion of the member, said rupturable portion being joined to the balance of the member by a juncture of such strength as to be destroyed under the influence of negative pressure gradients in excess of a predetermined high value greater than said predetermined low value of positive fluid pressure gradient, thereby permitting the rupturable portion to be at least partially severed from the balance of the closure member and permitting a reverse flow of fluid into said passageway.

(References on following page)

References Cited by the Examiner

UNITED STATES PATENTS

| | | | |
|---|---|---|---|
| 244,042 | 7/81 | Farrar | 166—224 |
| 329,509 | 11/85 | Tracy | 220—89 |
| 1,584,523 | 5/26 | Egbert | 220—89 |
| 1,598,382 | 8/26 | McNutt | 220—89 |
| 1,639,065 | 8/27 | Thagard | 175—318 |
| 2,117,536 | 5/38 | Baker et al. | 166—225 |
| 2,203,902 | 6/40 | Georgiev | 220—89 |
| 2,226,655 | 12/40 | Beaven | 175—393 |
| 2,372,331 | 3/45 | Lo Vico | 220—89 |
| 2,500,119 | 3/50 | Cooper | 220—27 X |
| 2,726,002 | 12/55 | Dalianis | 220—89 |
| 2,811,573 | 10/57 | Williams | 220—89 |
| 2,987,130 | 6/61 | McIntyre | 175—318 |
| 3,003,668 | 10/61 | Sherlock et al. | 220—53 |
| 3,029,987 | 4/62 | Gronemeyer. | |

CHARLES E. O'CONNELL, *Primary Examiner.*